(12) United States Patent
Yu et al.

(10) Patent No.: US 10,672,140 B2
(45) Date of Patent: Jun. 2, 2020

(54) VIDEO MONITORING METHOD AND VIDEO MONITORING SYSTEM

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Gang Yu, Beijing (CN); Chao Li, Beijing (CN); Qizheng He, Beijing (CN); Muge Chen, Beijing (CN); Qi Yin, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 295 days.

(21) Appl. No.: 15/597,959

(22) Filed: May 17, 2017

(65) Prior Publication Data
US 2017/0345181 A1    Nov. 30, 2017

(30) Foreign Application Priority Data

May 27, 2016  (CN) .......................... 2016 1 0366216

(51) Int. Cl.
*H04N 7/18* (2006.01)
*G06T 7/70* (2017.01)
(Continued)

(52) U.S. Cl.
CPC ................ *G06T 7/70* (2017.01); *G06T 7/194* (2017.01); *G06T 7/246* (2017.01); *G06T 7/251* (2017.01);
(Continued)

(58) Field of Classification Search
CPC ........... G06T 7/70; G06T 7/194; G06T 7/246; G06T 2207/10028; G06T 2207/30196;
(Continued)

(56) References Cited

U.S. PATENT DOCUMENTS

| 6,215,519 B1 | 4/2001 | Nayar et al. |
| 2004/0155962 A1* | 8/2004 | Marks ..................... G06T 7/248 348/169 |

(Continued)

FOREIGN PATENT DOCUMENTS

| CN | 1543200 | 11/2004 |
| CN | 102147869 | 8/2011 |

(Continued)

OTHER PUBLICATIONS

First Chinese Office Action, issued in the corresponding Chinese patent application No. 201610366216.9, dated Apr. 26, 2018, 27 pages.

(Continued)

*Primary Examiner* — Eileen M Adams
(74) *Attorney, Agent, or Firm* — Hamre, Schumann, Mueller & Larson, P.C.

(57) ABSTRACT

This application provides a video monitoring method and process. The video monitoring method comprises: obtaining first and second video data of a scene being monitored; detecting at least one target object based on the first video data, and determining parameter information of the at least one target object in at least one frame of the first video data, the parameter information including a first position; determining, based on coordinate transforming relationship between the first and the second video data, a second position of the at least one target object in a corresponding frame in the second video data according to the first position; and extracting, based on the second video data, feature (Continued)

information of the at least one target object located in the second position, wherein orientations with which the first and the second video acquiring module acquire video data with respect to a ground plane are different.

20 Claims, 9 Drawing Sheets

(51) Int. Cl.
    *G06T 7/246*         (2017.01)
    *G06T 7/194*         (2017.01)
    *H04N 13/204*      (2018.01)
    *H04N 13/00*        (2018.01)

(52) U.S. Cl.
    CPC ........... *H04N 7/181* (2013.01); *H04N 13/204* (2018.05); *G06T 2207/10024* (2013.01); *G06T 2207/10028* (2013.01); *G06T 2207/30196* (2013.01); *G06T 2207/30232* (2013.01); *G06T 2207/30241* (2013.01); *H04N 2013/0081* (2013.01)

(58) Field of Classification Search
    CPC ........... G06T 2207/30232; G06T 2207/30241; lH04N 13/204; H04N 7/181; H04N 2013/0081
    See application file for complete search history.

(56) References Cited

U.S. PATENT DOCUMENTS

| | | | | |
|---|---|---|---|---|
| 2009/0324010 | A1* | 12/2009 | Hou | ................... G06K 9/00771 |
| | | | | 382/103 |
| 2011/0285845 | A1* | 11/2011 | Bedros | ............... G06K 9/00255 |
| | | | | 348/143 |
| 2013/0184592 | A1* | 7/2013 | Venetianer | ............... H04N 7/18 |
| | | | | 600/476 |

FOREIGN PATENT DOCUMENTS

| | | |
|---|---|---|
| CN | 102148965 | 8/2011 |
| CN | 102930524 | 2/2013 |
| CN | 103260009 | 8/2013 |
| CN | 103971135 | 8/2014 |
| CN | 104376577 | 2/2015 |
| CN | 104994360 | 10/2015 |
| EP | 0714081 | 5/1996 |

OTHER PUBLICATIONS

Liu et al., "Action classification based on action-identity model", China New Technologies and Products, No. 4, 2 pages, 2014.
Li et al., "A convolutional Neural Network Cascade for Face Detection", IEEE, pp. 5325-5334, IEEE 2015.

* cited by examiner

VIDEO MONITORING METHOD AND VIDEO MONITORING SYSTEM

CROSS-REFERENCE TO RELATED APPLICATION

This application claims priority to Chinese patent application No. 201610366216.9 filed on May 27, 2016, the entire contents of which are incorporated herein by reference.

TECHNICAL FIELD

The present disclosure relates to the field of video monitoring, and more particularly, to a video monitoring method and a video monitoring system using the video monitoring method

BACKGROUND

Tracking and identity analysis of pedestrians in a monitoring video is of great value for many application fields. For example, as for smart retail, stores hope to learn each customer's complete trajectory inside the stores, meanwhile be aware of each customer's identity attributes such as approximate age, dressing etc., as well as action behaviors such as touching which commodities in the stores. In addition, as for security surveillance, in a sensitive scene, it needs to monitor each pedestrian in the scene being monitored, to determine whether each pedestrian has actions such as abnormal behaviors etc. Therefore, it needs to locate and track exact positions of pedestrians in the scene, and it is also hoped that by tracking pedestrians, some identity attribute information and action analysis of pedestrians can be obtained.

A single-view monitoring video acquiring device used currently cannot solve this problem. For example, in the case of using a top-view camera, although there is no blocking among pedestrians and positions of pedestrians in each frame can be located very well, it is hard to see other information of each pedestrian except his/her head due to limitations of the top-view angle per se, thus it is impossible to implement analysis of identify attributions and possible actions of pedestrians. On the other hand, in the case of using an overhead-view camera, although appearance of each pedestrian can be seen to a large extent, because of blocking among pedestrians, it makes difficulties to detection and tracking of pedestrians themselves.

SUMMARY

The present disclosure is provided in view of the above problems. The present disclosure provides a video monitoring method and a video monitoring system using the video monitoring method, which can implement complete pedestrian detection and tracking, as well as accurate recognition of identity features and action features, by means of integrating monitoring information of two view angles of a top view and an overhead view.

According to an embodiment of the present disclosure, there is provided a video monitoring method, comprising: obtaining first video data and second video data of a scene being monitored as acquired simultaneously via a first video acquiring module and a second video acquiring module, respectively; detecting at least one target object based on the first video data, and determining parameter information of the at least one target object in at least one frame of the first video data, the parameter information including a first position; determining, based on coordinate transforming relationship between the first video data and the second video data, a second position of the at least one target object in a corresponding frame in the second video data according to the first position; and extracting, based on the second video data, feature information of the at least one target object located in the second position, wherein orientations with which the first video acquiring module and the second video acquiring module acquire video data with respect to a ground plane are different, and the first video acquiring module and the second video acquiring module include a depth video data acquiring module respectively.

In addition, the video monitoring method according to an embodiment of the present disclosure further comprises: disposing the first video acquiring module and the second video acquiring module, and determining a first coordinate parameter of the first video acquiring module and a second coordinate parameter of the second video acquiring module; and determining the coordinate transforming relationship based on the first coordinate parameter and the second coordinate parameter, wherein the first video acquiring module and the second video acquiring module are disposed in different positions, the first video acquiring module is a top-view video acquiring module, and the second video acquiring module is an overhead-view video acquiring module.

In addition, in the video monitoring method according to an embodiment of the present disclosure, the step of detecting at least one target object based on the first video data, and determining parameter information of the at least one target object in at least one frame of the first video data comprises: obtaining a region that includes pixel dots whose depth information is different from ground depth information of the scene being monitored as a foreground candidate region; dividing the foreground candidate region into a plurality of foreground candidate sub-regions according to the depth information; and filtering the plurality of foreground candidate sub-regions based on a first area threshold and/or a first height threshold to obtain a plurality of foreground sub-regions.

In addition, in the video monitoring method according to an embodiment of the present disclosure, the step of detecting at least one target object based on the first video data, and determining parameter information of the at least one target object in at least one frame of the first video data further comprises: filtering the plurality of foreground sub-regions to determine a position of a candidate peak that is greater than a second height threshold; and using a trained classifier to determine whether the position of the candidate peak corresponds to a head of the at least one target object.

In addition, the video monitoring method according to an embodiment of the present disclosure further comprises: according to a head position detected, associating between at least two frames of the first video data, to determine the first position of the at least one target object in respective frames of the first video data, and thereby obtain dynamic feature information of the at least one target object.

In addition, in the video monitoring method according to an embodiment of the present disclosure, the step of extracting, based on the second video data, feature information of the at least one target object located in the second position comprises: obtaining the corresponding frame of the at least one target object in the second video data, the at least one target object being located in the second position in the corresponding frame; obtaining, via a first neural network, first feature information of the at least one target object in the corresponding frame based on video data in the corresponding frame; and obtaining, via a second neural network, identity feature information of the at least one target object in the corresponding frame based on the first feature information in the corresponding frame and identity feature information of the at least one target object obtained in any frame before the corresponding frame.

In addition, in the video monitoring method according to an embodiment of the present disclosure, the step of extracting, based on the second video data, feature information of the at least one target object located in the second position further comprises: obtaining, via a third neural network, third feature information in the corresponding frame of the at least one target object based on video data in the corresponding frame; and obtaining, via a fourth neural network, action feature information of the at least one target object in the corresponding frame based on the third feature information in the corresponding frame, the identity information of the at least one target object obtained in the corresponding frame, and action feature information of the at least one target object obtained in any frame before the corresponding frame.

In addition, in the video monitoring method according to an embodiment of the present disclosure, the action feature information includes skeleton information and action attribute information, the skeleton information includes a plurality of key points on skeleton of the at least one target object, the fourth neural network outputs coordinate positions of the plurality of keys in the corresponding frame.

According to another embodiment of the present disclosure, there is provided a video monitoring system comprising: a first video acquiring module for acquiring first video data of a scene being monitored; a second video acquiring module for acquiring second video data of the scene being monitored simultaneously with the first video acquiring module, orientations with which the first video acquiring module and the second video acquiring module acquire video data with respect to a ground plane being different, and the first video acquiring module and the second video acquiring module including a depth video data acquiring module respectively; and a video monitoring module for monitoring at least one target object in a video based on video data, the video monitoring module including: a monitored target object determining unit for detecting at least one target object based on the first video data, and determining parameter information of the at least one target object in at least one frame of the first video data, the parameter information including a first position; a video coordinate transforming unit for determining, based on coordinate transforming relationship between the first video data and the second video data, a second position of the at least one target object in a corresponding frame in the second video data according to the first position; and a feature information extracting unit for extracting, based on the second video data, feature information of the at least one target object located in the second position.

In addition, in the video monitoring system according to an embodiment of the present disclosure, the first video acquiring module and the second video acquiring module are disposed in different positions, the first video acquiring module is a top-view video acquiring module, and the second video acquiring module is an overhead-view video acquiring module, the video coordinate transforming unit determines a first coordinate parameter of the first video acquiring module and a second coordinate parameter of the second video acquiring module, and determines the coordinate transforming relationship based on the first coordinate parameter and the second coordinate parameter.

In addition, in the video monitoring system according to an embodiment of the present disclosure, the monitored target object determining unit obtains a region that includes pixel dots whose depth information is different from ground depth information of the scene being monitored as a foreground candidate region, divides the foreground candidate region into a plurality of foreground candidate sub-regions according to the depth information, and filters the plurality of foreground candidate sub-regions based on a first area threshold and/or a first height threshold to obtain a plurality of foreground sub-regions.

In addition, in the video monitoring system according to an embodiment of the present disclosure, the monitored target object determining unit filters the plurality of foreground sub-regions to determine a position of a candidate peak that is greater than a second height threshold, and uses a trained classifier to determine whether the position of the candidate peak corresponds to a head of the at least one target object.

In addition, in the video monitoring system according to an embodiment of the present disclosure, the monitored target object determining unit associates, according to a head position detected, between at least two frames of the first video data, to determine the first position of the at least one target object in respective frames of the first video data, and thereby obtain dynamic feature information of the at least one target object.

In addition, in the video monitoring system according to an embodiment of the present disclosure, the feature information extracting unit obtains the corresponding frame of the at least one target object in the second video data, the at least one target object being located in the second position in the corresponding frame; the feature information extracting unit obtains, via a first neural network, first feature information of the at least one target object in the corresponding frame based on video data in the corresponding frame, and obtains, via a second neural network, identity feature information of the at least one target object in the corresponding frame based on the first feature information in the corresponding frame and identity feature information of the at least one target object obtained in any frame before the corresponding frame.

In addition, in the video monitoring system according to an embodiment of the present disclosure, the feature information extracting unit obtains, via a third neural network, third feature information in the corresponding frame of the at least one target object based on video data in the corresponding frame, and obtains, via a fourth neural network, action feature information of the at least one target object in the corresponding frame based on the third feature information in the corresponding frame, the identity information of the at least one target object obtained in the corresponding frame, and action feature information of the at least one target object obtained in any frame before the corresponding frame.

In addition, in the video monitoring system according to an embodiment of the present disclosure, the action feature information includes skeleton information and action attribute information, the skeleton information includes a plurality of key points on skeleton of the at least one target object, the fourth neural network outputs coordinate positions of the plurality of keys in the corresponding frame.

According to yet another embodiment of the present disclosure, there is provided a computer program product, comprising a computer-readable medium on which computer program instructions configured to execute the following steps when being run by a computer are stored: obtaining first video data and second video data of a scene being monitored as acquired simultaneously via a first video acquiring module and a second video acquiring module, respectively; detecting at least one target object based on the first video data, and determining parameter information of the at least one target object in at least one frame of the first video data, the parameter information including a first position; determining, based on coordinate transforming relationship between the first video data and the second video data, a second position of the at least one target object in a corresponding frame in the second video data according to the first position; and extracting, based on the second video data, feature information of the at least one target object located in the second position, wherein orientations with which the first video acquiring module and the second video acquiring module acquire video data with respect to a ground plane are different, and the first video acquiring module and the second video acquiring module include a depth video data acquiring module respectively.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure.

Hereinafter, the embodiments of the present disclosure will be described in detail with reference to the accompanying drawings.

Figure 1:
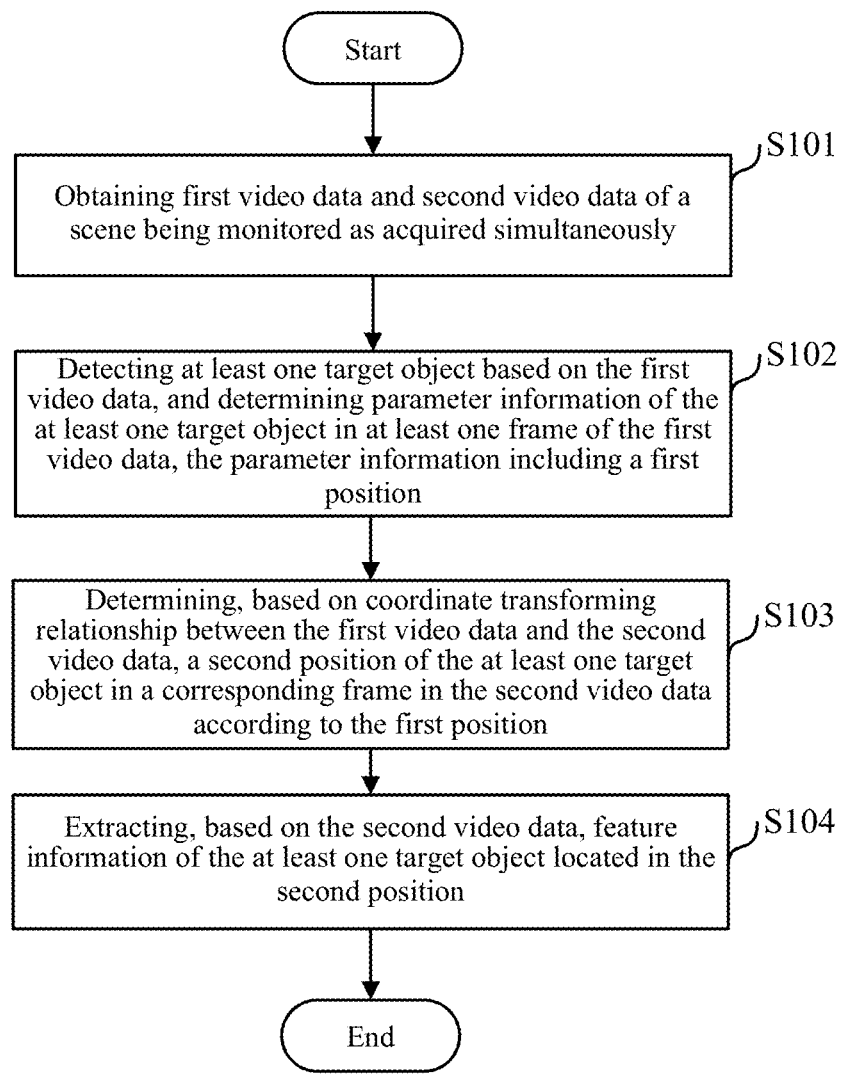
FIG. 1 is a flowchart briefly illustrating the video monitoring method according to an embodiment of the present disclosure.

FIG. 1 is a flowchart briefly illustrating the video monitoring method according to an embodiment of the present disclosure. As shown in FIG. 1, the video monitoring method according to an embodiment of the present disclosure comprises the following steps.

In step S101, first video data and second video data of a scene being monitored are obtained simultaneously.

As will be described in detail below by making reference to the drawings, in an embodiment of the present disclosure, first video data and second video data of a scene being monitored as acquired simultaneously via a first video acquiring module and a second video acquiring module, respectively, are obtained. Orientations with which the first video acquiring module and the second video acquiring module acquire video data with respect to a ground plane are different, and the first video acquiring module and the second video acquiring module include a depth video data acquiring module respectively, so that the first video data and the second video data include depth video data and RGB color video data. More specifically, the first video acquiring module and the second video acquiring module are disposed in different positions, and orientations with which the first video acquiring module and the second video acquiring module acquire video data with respect to a ground plane are different, the first video acquiring module is a top-view video acquiring module, its view angle is shooting vertically downward, and the second video acquiring module is an overhead-view video acquiring module, its view angle is overlooking down at the ground. The first video acquiring module and the second video acquiring module are configured as capable of covering the same scene being monitored or at least parts of the same scene being monitored. Thereafter, the processing proceeds to step S102.

In step S102, at least one target object is detected based on the first video data, and parameter information of the at least one target object in at least one frame of the first video data is determined, the parameter information including a first position.

As will be described in detail below by making reference to the drawings, in an embodiment of the present disclosure, the first video data is acquired by using the first video acquiring module (the top-view video acquiring module), since the view angle for video acquiring is shooting vertically downward, there is no blocking among pedestrians, thus as to each pedestrian which serves a target object in the scene being monitored, his/her exact position (the first position) can be detected accurately, as parameter information of the target object in at least one frame of the first video data. Further, the target object in each frame of video data may be associated to track each pedestrian in multiple consecutive frames, so as to determine the position of each pedestrian in each frame of the first video data and regard the determined position as the first position of the target object in each frame of the first video data, so as to implement obtaining of the dynamic feature information such as a movement trajectory. Thereafter, the processing proceeds to step S103.

In step S103, a second position of the at least one target object in a corresponding frame in the second video data is determined based on coordinate transforming relationship between the first video data and the second video data according to the first position.

As will be described in detail below by making reference to the drawings, in an embodiment of the present disclosure, the coordinate transforming relationship between the first video data and the second video data is determined based on relative position relationship between the first video acquiring module (the top-view video acquiring module) and the second video acquiring module (the overhead-view video acquiring module). Further, based on the coordinate transforming relationship, it is possible to transform the first position of the at least one target object in the first video data (top-view video data) as determined in step S102 to a corresponding position (the second position) of the at least one target object in a corresponding frame in the second video data (overhead-view video data). By means of detecting the position of the target object based on the first video data (top-view video data), missed detection or mistaken detection that may be probably caused by blocking among pedestrians when using the second video data (overhead-view video data) to detect the target object can be avoided. Thereafter, the processing proceeds to step S104.

In step S104, feature information of the at least one target object located in the second position is extracted based on the second video data.

As will be described in detail below by making reference to the drawings, in an embodiment of the present disclosure, feature information of the at least one target object located in the second position is extracted based on the second video data by using a neural network (e.g., a convolution neural network and a feedback neural network). The feature information of the at least one target object includes, but not limited to, identify feature information, action feature information etc. The identify feature information includes, but not limited to, attribute information such as gender, age, style of dress, height, weight, hair color, hair length etc. Further, as to each identify feature attribute information, it may be quantified as a multi-classification issue. For example, as to the identify feature attribute information of age, it may be quantified as children (0), juvenile (1), youth (2), middle-aged (3), old-aged (4) and the like; as to the identity feature attribute information of gender, it may be quantified as male (0) and female (1); as to style of dress, it may be quantified as business attire (0), casual wear (1), sports wear (2), uniforms (3) and the like; height may be quantified as high (0), short (1) and the like; weight can be quantified as overweight (0), normal (1), underweight (2) and the like; hair color may be quantified as black (0), white (1), other color (2) and the like; hair length may be quantified as long hair (0), medium hair (1), short hair (2), super short hair (3) and the like, so as to implement multi-classification of each type of identify feature attribute information. The action feature information includes, but not limited to, skeleton information and action information. Similar to the identify feature information, each type of action feature information may also be quantified as a multi-classification issue. For example, an action activity of the target object in the stores may be quantified as viewing commodities (0), stopping (1), experiencing commodities (2) and the like. Therefore, as for the multi-classification issue of the extracted object feature information such as the identify feature information and the action feature information etc., associated error functions may be used respectively to adjust parameters of the neural network and train the neural network. In an embodiment, a first neural network (e.g., a first convolution neural network) and a second neural network (e.g., a second feedback neural network) are used to extract identify feature information of the target object based on the second video data. In the process of training the first neural network and the second neural network, loss functions generated by calculating each type of identify feature attribute information may be integrated together to adjust the first neural network and the second neural network and thereby obtain a trained first neural network and a trained second neural network for extracting the identity feature information of the target object. In an embodiment, a third neural network (e.g., a third convolution neural network) and a fourth neural network (e.g., a fourth feedback neural network) are used to extract action feature information of the target object based on the second video data. In the process of training the third neural network and the fourth neural network, loss functions generated by calculating each type of action feature information may be integrated together, to adjust the third neural network and the fourth neural network and thereby obtain a trained third neural network and a trained fourth neural network for extracting the action feature information of the target object.

It should be understood that the identity feature information and the action feature information and their classification and quantification described above are merely exemplary, different identify feature information and different action feature information may be adopted, classified, and quantified according to needs in practical applications.

In the above-described video monitoring method according to an embodiment of the disclosure, with cooperation of the top-view video acquiring module and the overhead-view video acquiring module, first, the top-view video data obtained when there is no blocking among target objects is used to accurately detect and track a target object in the scene being monitored, so as to obtain information of the first position of the target object in the top-view video data (i.e., the first video data); through coordinate transforming relationship between the top-view video data and the overhead-view video data, the corresponding second position of the target object in the overhead-view video data (i.e., the second video data) is obtained and tracked; as to each target object that has already been accurately located in the overhead-view video data, acquisition of feature information such as identify feature information and action feature information of the target object in the scene being monitored is achieved by making use of an advantage that the overhead-view video data can provide more feature information of the target object. That is to say, the video monitoring method according to an embodiment of the present disclosure implements complete pedestrian detection and tracking, as well as accurate recognition of identity features and action features, by means of integrating monitoring information of two view angles of the top-view and the overhead view.

Hereinafter, a video monitoring system that executes the above video monitoring method will be further described with reference to FIG. 2.

Figure 2:
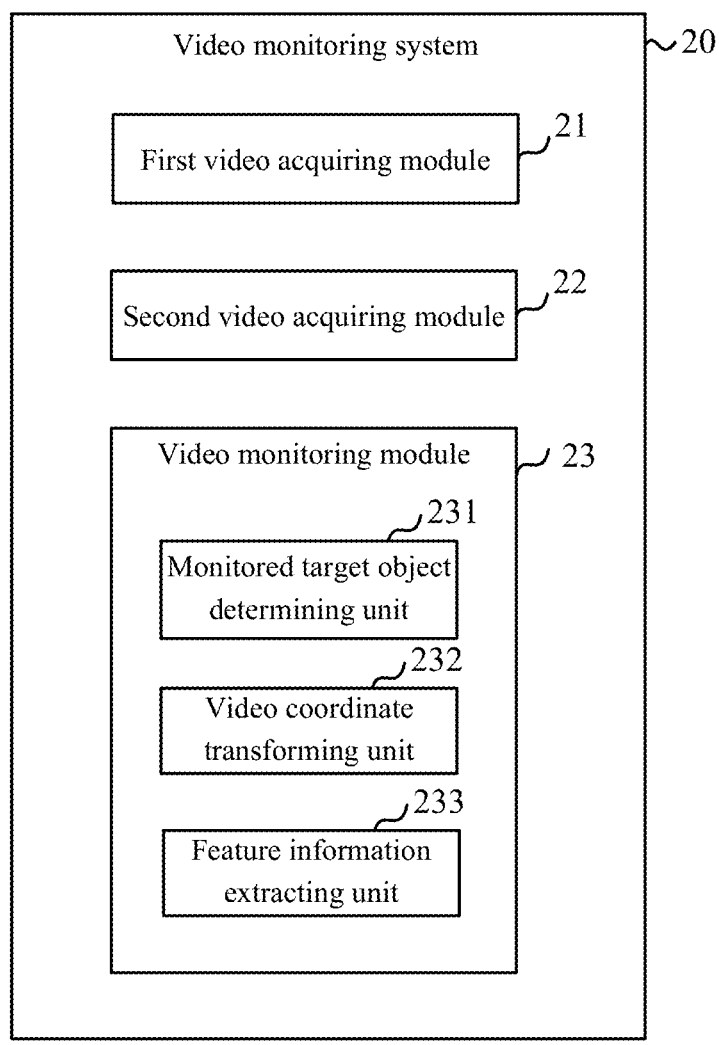
FIG. 2 is a functional block diagram illustrating the video monitoring system according to an embodiment of the present disclosure.

FIG. 2 is a functional block diagram illustrating the video monitoring system according to an embodiment of the present disclosure. As shown in FIG. 2, the video monitoring system 20 according to an embodiment of the present disclosure comprises a first video acquiring module 21, a second video acquiring module 22, and a video monitoring module 23.

Specifically, the first video acquiring module 21 is for acquiring first video data of a scene being monitored; the second video acquiring module 22 is for acquiring second video data of the scene being monitored simultaneously with the first video acquiring module. Orientations with which the first video acquiring module 21 and the second video acquiring module 22 acquire video data with respect to a ground plane are different, and the first video acquiring module 21 and the second video acquiring module 22 include a depth video data acquiring module respectively. In an embodiment of the present disclosure, the first video acquiring module and the second video acquiring module are disposed in different positions, and orientations with which the first video acquiring module 21 and the second video acquiring module 22 acquire video data with respect to a ground plane are different, the first video acquiring module 21 and the second video acquiring module 22 are configured as capable of covering the same scene being monitored or at least parts of the same scene being monitored, the first video acquiring module 21 is a top-view video acquiring module, and the second video acquiring module 22 is an overhead-view video acquiring module. Disposing of the first video acquiring module 21 and the second video acquiring module 22 will be described with reference to FIGS. 3A and 3B.

Figure 3A:
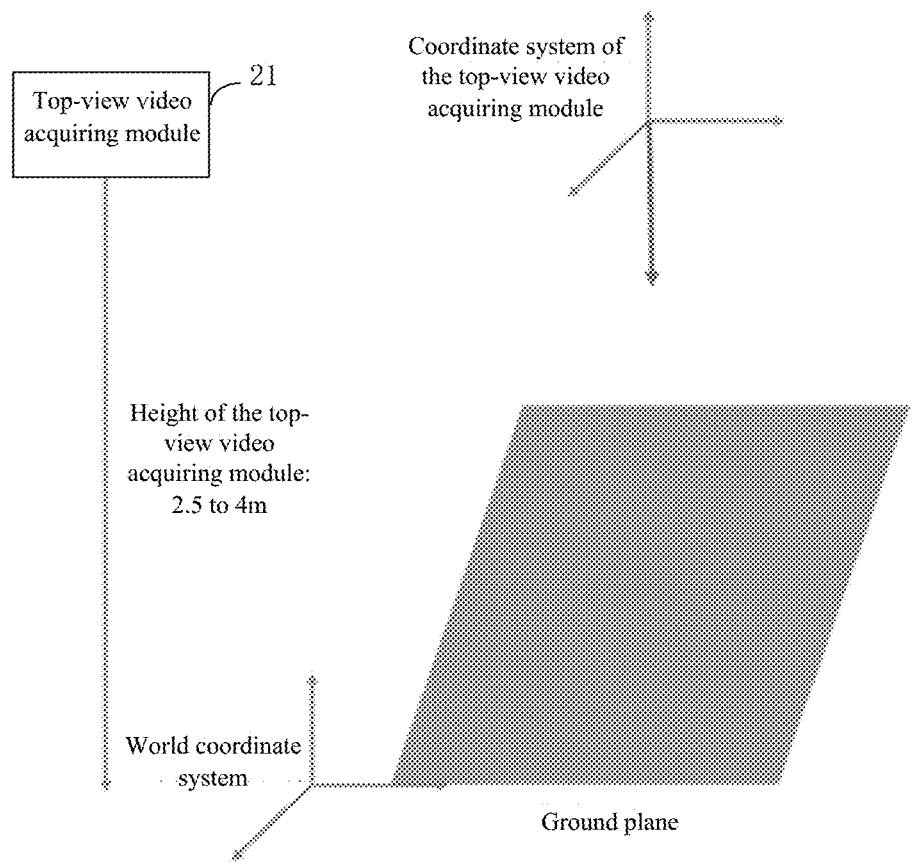
FIGS. 3A and 3B are schematic diagrams illustrating a video acquiring module in the video monitoring system according to an embodiment of the present disclosure.
Figure 3B:
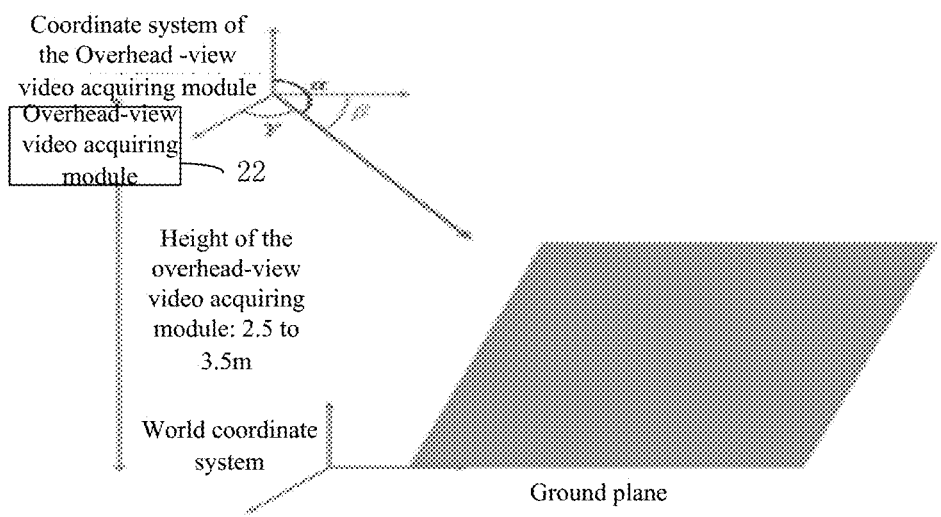

FIGS. 3A and 3B are schematic diagrams illustrating a video acquiring module in the video monitoring system according to an embodiment of the present disclosure. FIG. 3A shows the first video acquiring module 21 (the top-view video acquiring module), and FIG. 3B shows the second video acquiring module 22 (the overhead-view video acquiring module).

As shown in FIG. 3A, the first video acquiring module 21 (the top-view video acquiring module) is a depth video acquiring module, its installing height is 2.5 to 4 meters, its view angle is shooting vertically downward (as shown schematically in FIG. 3). In an embodiment of the present disclosure, the first video acquiring module 21 may be a depth camera, such as a depth color dual-lens camera. In the case of the depth color dual-lens camera, the camera needs to be calibrated, so that images acquired by two lenses are corresponding and synchronized. In addition, as to the already-installed first video acquiring module 21, coordinate parameters such as its actual height from a reference plane and its angle and so on are determined. A plurality of reference points on a predetermined reference plane are selected, as shown in FIG. 3A, the predetermined reference plane may be the ground plane, the larger the quantity of the selected reference points is (e.g., larger than or equal to 5), the higher the accuracy is. Transforming relationship between a camera coordinate system of the first video acquiring module 21 and a world coordinate system is determined based on coordinate information of the selected plurality of reference points. Through the selected plurality of reference points, a transforming matrix from the camera coordinate system to the world coordinate system, i.e., transforming relationship between the camera coordinate system and the world coordinate system, may be estimated based on the least-squares method. By means of transforming the camera coordinate system into the world camera system using the transforming relationship, coordinate parameters of the first video acquiring module 21 such as its actual height and angle and so on can be determined. Likewise, by means of transforming the pixel dots in the video acquired by the first video acquiring module 21 into the world coordinate system, a complete ground plane position in the scene being monitored in the video can be determined.

As shown in FIG. 3B, the second video acquiring module 22 (the overhead-view acquiring module) is a depth video acquiring module, its installing height is 2.5 to 3.5 meters, its view angle is overlooking down at the ground (as shown schematically in FIG. 3B). In an embodiment of the present disclosure, the second video acquiring module 22 may be a depth camera, such as a depth color dual-lens camera. Similarly, the second video acquiring module 22 camera needs to be calibrated, so that images acquired by two lenses are corresponding and synchronized. In addition, transforming between the camera coordinate system of the second video acquiring module 22 and the world coordinate system also needs to be executed.

In addition, in an embodiment of the present disclosure, mapping relationship between the top-view view angle and the overhead-view view angle needs to be established, that is, the word coordinate systems used by the first video acquiring module 21 (the top-view video acquiring module) and the second video acquiring module 22 (the overhead-view acquiring module) need to be unified. Specifically, N pairs of matching points in the top-view video data and the overhead-view video data of the same scene are selected, for example, a single test subject is made to move in the scene in advance, the test subject's positions in the top-view video data and the overhead view video data at every moment are recorded, since there is only a single test subject in the scene, the problem of blocking does not exist, thus it is easy to accurately determine position points of the test subject at N time points in the top-view video data and the overhead view video data, and these determined position points in the top-view video data and the overhead-view video data are taken as N pairs of matching points. For example, N pairs of matching points in the top-view video data and the overhead view video data are respectively as follows:

$$X\_t_i = (x\_t_i, y\_t_i, z\_t_i)$$

$$X\_b_i = (x\_b_i, y\_b_i, z\_b_i), i=1, \ldots N$$

It is supposed that the world coordinate system used by the first video acquiring module 21 (the top-view video acquiring module) may be transformed to the world coordinate system used by the second video acquiring module 22 (the overhead-view acquiring module) through rotation and translation. It is supposed that said rotation is represented by a rotation matrix R, and said translation is represented by a translation matrix T, then $RX\_t_i + T = X\_b_i$. Further, by using the least-squares method, an approximate estimation of the rotation matrix R and the translation matrix T can be obtained, thereby the mapping relationship between the top-view view angle and the overhead overhead-view view angle is established, that is, the coordinate transforming relationship between the first video data and the second video data.

Reference is made back to FIG. 2. The first video data and the second video data of the scene being monitored as acquired simultaneously via the first video acquiring module and the second video acquiring module, respectively, are provided to the video monitoring module 23. The first video acquiring module 21 and the second video acquiring module 22 may be physically separated from the subsequent video monitoring module 23, or may be physically located on the same position or even within the same housing with the subsequent video monitoring module 23. In the case where the first video acquiring module 21 and the second video acquiring module 22 are physically separated from the subsequent video monitoring module 23, the first video acquiring module 21 and the second video acquiring module 22 further transmit the first video data and the second video data acquired by them respectively to the subsequent module in a wired or wireless manner. In the case where the first video acquiring module 21 and the second video acquiring module 22 are located on the same position or even within the same housing with the subsequent video monitoring module 23, the first video acquiring module 21 and the second video acquiring module 22 further transmit the first video data and the second video data acquired by them respectively to the subsequent module via an internal bus. Prior to transmitting the first video data and the second video data in a wired or wireless manner or via a bus, it is possible to encode them with a predetermined format and compress them as a video packet, so as to reduce traffic and bandwidth that are required by the transmission.

The video monitoring module 23 is for monitoring at least one target object in the video based on the first video data and the second video data. The video monitoring module 23 further includes a monitored target object determining unit 231, a video coordinate transforming unit 232, and a feature information extracting unit 233.

The monitored target object determining unit 231 is for detecting at least one target object based on the first video data, and determining parameter information of the at least one target object in at least one frame of the first video data, the parameter information including a first position. As described above, in the first video data acquired by the first video acquiring module 21 (the top-view video acquiring module), since there is no blocking among pedestrians, thus as to each pedestrian which serves a target object in the scene being monitored, his/her exact position can be detected accurately as parameter information of the target object in at least one frame of the first video data.

The video coordinate transforming unit 232 is for determining, based on coordinate transforming relationship between the first video data and the second video data, a second position of the at least one target object in a corresponding frame in the second video data according to the first position. As described above, by means of detecting the position of the target object based on the first video data (top-view video data), it avoids missed detection or mistaken detection that may be probably caused by blocking among pedestrians when using the second video data (overhead-view video data) to detect the target object.

The feature information extracting unit 233 is for extracting, based on the second video data, feature information of the at least one target object located in the second position. In an embodiment, the feature information extracting unit 233 is for extracting, based on the second video data, feature information of the at least one target object located in the second position by using a neural network. As described above, the feature information of the at least one target object includes, but not limited to, identify feature information, action feature information etc. As for the multi-classification issue of the extracted object feature information such as the identify feature information and the action feature information etc., associated error functions may be used respectively to adjust parameters of the neural network and train the neural network. In an embodiment, a first neural network (e.g., a first convolution neural network) and a second neural network (e.g., a second feedback neural network) are used by the feature information extracting unit 233 to extract identify feature information of the target object based on the second video data. In the process of training the first neural network and the second neural network, loss functions generated by calculating each type of identify feature attribute information may be integrated together to adjust the first neural network and the second neural network and thereby obtain a trained first neural network and a trained second neural network for extracting the identity feature information of the target object. In an embodiment, a third neural network (e.g., a third convolution neural network) and a fourth neural network (e.g., a fourth feedback neural network) are used by the feature information extracting unit 233 to extract action feature information of the target object based on the second video data. In the process of training the third neural network and the fourth neural network, loss functions generated by calculating each type of action feature information may be integrated together, to adjust the third neural network and the fourth neural network and thereby obtain a trained third neural network and a trained fourth neural network for extracting the action feature information of the target object.

In the above, the video monitoring method and the video monitoring system that executes the video monitoring method according to the embodiments of the present disclosure are described with reference to FIGS. 1 to 3B. Hereinafter, the video monitoring method according to the embodiments of the present disclosure will be further described in detail with reference to flowcharts and schematic diagrams.

Figure 4:
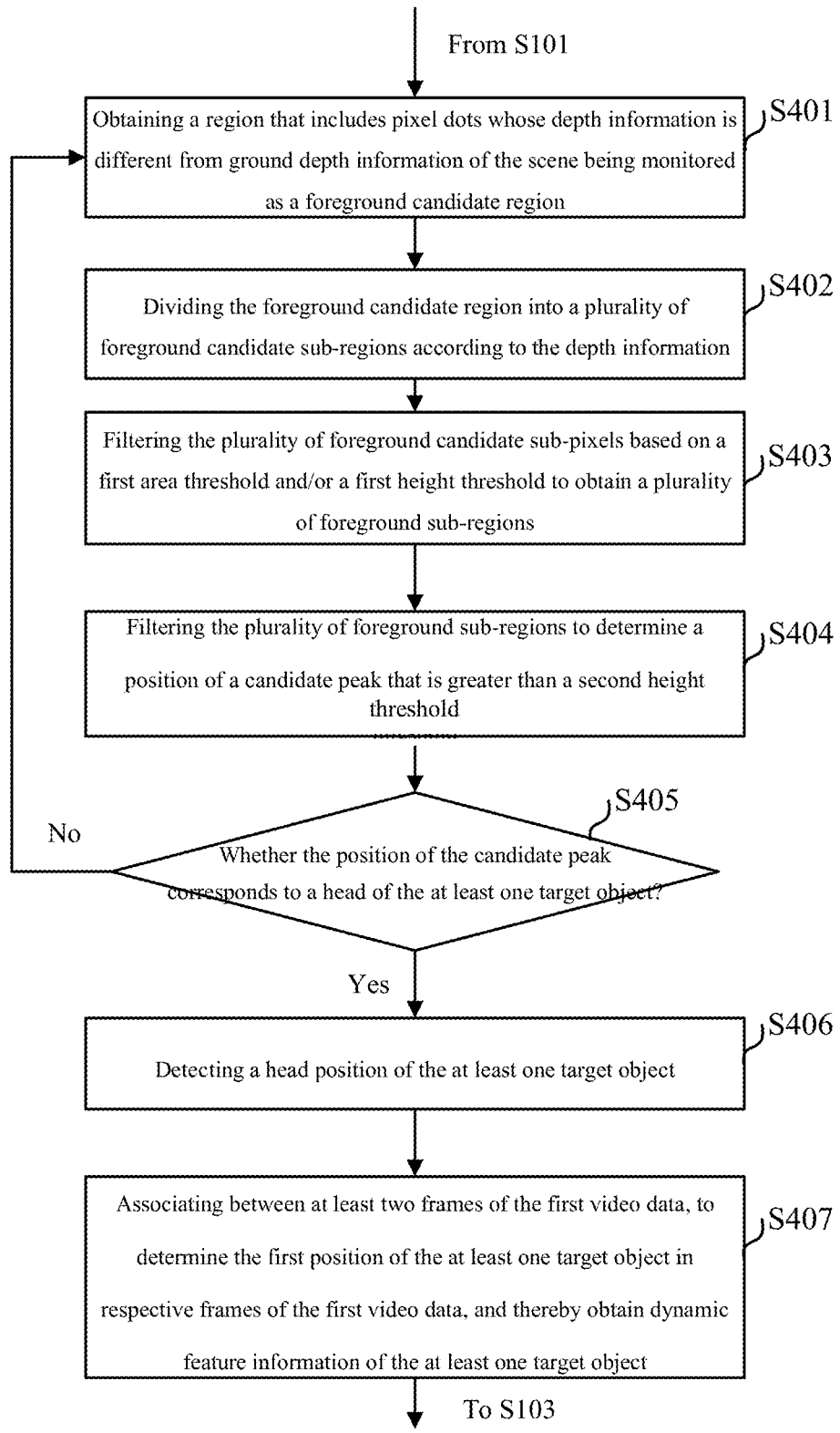
FIG. 4 is a flowchart further illustrating the processing of target object detection and dynamic feature information tracking in the video monitoring method according to an embodiment of the present disclosure.
Figure 5:
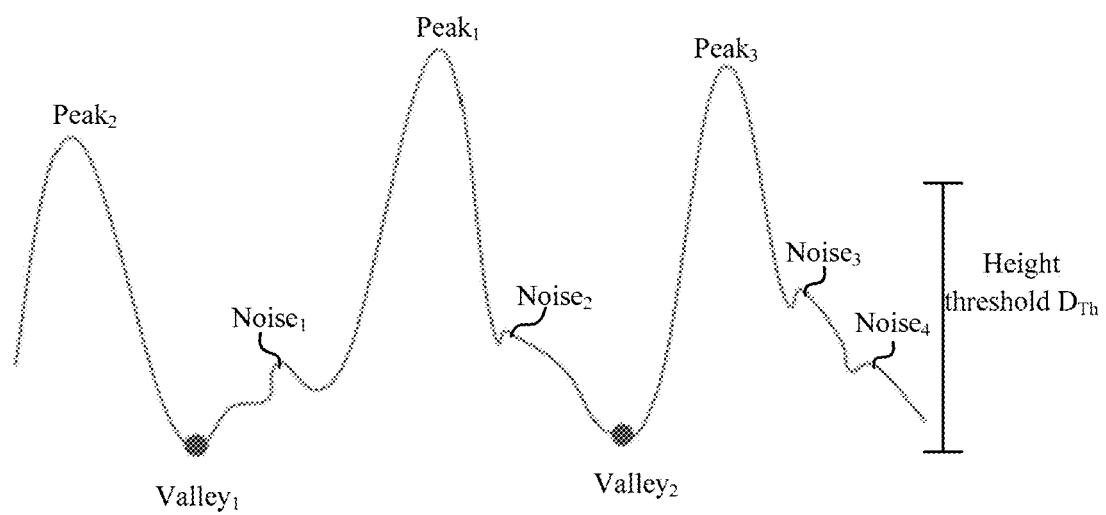
FIG. 5 is a schematic diagram illustrating target object detection in the video monitoring method according to an embodiment of the present disclosure.

FIG. 4 is a flowchart further illustrating the processing of target object detection and dynamic feature information tracking in the video monitoring method according to an embodiment of the present disclosure. FIG. 5 is a schematic diagram illustrating target object detection in the video monitoring method according to an embodiment of the present disclosure.

As shown in FIG. 4, after obtaining the first video data and the second video data of the scene being monitored as acquired simultaneously in step S101 shown in FIG. 1, the processing proceeds to step S401, so as to execute the processing of target object detection and dynamic feature information tracking.

In step S401, a region that includes pixel dots whose depth information is different from ground depth information of the scene being monitored is obtained as a foreground candidate region.

In an embodiment of the present disclosure, in the case where there is no object in the scene being monitored, ground depth information of each position in the scene being monitored as captured by the first video acquiring module 21 is acquired in advance, and saved as a matrix D (x, y), which represents a ground depth value at each image coordinate (x, y). A current depth value C (x, y) of the scene being monitored as captured in real-time by the first video acquiring module 21 is obtained, thus a depth information difference ΔD=C (x, y)–D (x, y) at each pixel position is calculated in an image space. Further, a region that includes pixel dots whose depth information difference is larger than a first predetermined threshold is obtained as a foreground candidate region. In an embodiment of the present disclosure, in the case where a ground basic level of the scene being monitored has no obvious undulating, the ground depth information of each position is unified, then a region including pixel dots whose depth information is different from the ground depth information of the scene being monitored as captured in real-time in the scene being monitored can be regarded as the foreground candidate region. Thereafter, the processing proceeds to step S402.

In step S402, the foreground candidate region is divided into a plurality of foreground candidate sub-regions according to the depth information. For example, according to the depth information, regions whose depth information is the same or similar may be divided into one foreground candidate sub-region. Thereafter, the processing proceeds to step S403.

In step S403, the plurality of foreground candidate sub-regions are filtered based on a first area threshold and/or a first height threshold to obtain a plurality of foreground sub-regions. The first area threshold is for filtering out a candidate sub-region that has no possibility of being a target object because its area is too small from among the plurality of foreground candidate sub-regions. The first height threshold is for filtering out a candidate sub-region whose height from the ground is too small from among the plurality of foreground candidate sub-regions. Thereafter, the processing proceeds to step S404.

In step S404, the plurality of foreground sub-regions are filtered to determine a position of a candidate peak that is greater than a second height threshold.

Filtering the plurality of foreground sub-regions to determine a position of a candidate peak whose height is higher than the second height threshold, i.e., determining the position of a head of the candidate target object, will be described in further detail by making reference to FIG. 5. FIG. 5 is a schematic diagram illustrating target object detection in the video monitoring method according to an embodiment of the present disclosure.

As to the plurality of foreground sub-regions, since probably there might be a situation that multiple target objects are present in one foreground sub-region in a crowded condition. FIG. 5 shows the schematic depth map of a plurality of foreground sub-regions. An iterative peak search may be adopted to make search to detect positions of all the peaks. For example, the highest peak is searched out from the depth map, e.g., $Peak_1$. Filtering is carried out in the vicinity of $Peak_1$, all the points from $Peak_1$ to $Valley_1$ and $Valley_2$ are filtered, until the position of a next peak is found, such as $Peak_3$ in FIG. 5, if a magnitude value (a height from the hillside) of $Peak_3$ is larger than the first threshold, then $Peak_3$ is regarded as a crest; otherwise, it is filtered out. The position of a next peak is searched continuously, such as $Peak_2$ in FIG. 5, if a magnitude value (a height from the hillside) of $Peak_2$ is larger than the first threshold, then $Peak_2$ is regarded as a crest; otherwise, it is filtered out. All the peaks are found by the same way, as to all the peaks searched out in the depth map, their height values are compared with a second height threshold that is preset, the position of a peak that is larger than the preset second height threshold is the head of the target object. As such, peak positions where the head of the target object may be probably located in the plurality of foreground sub-regions can be detected, and $Noise_1$ to $Noise_4$ caused by shoulders of the target object can be filtered out.

Reference is made back to FIG. 4, after obtaining the position of the candidate peak that is higher than the second height threshold, the processing proceeds to step S405.

In step S405, it is determined whether the position of the candidate peak corresponds to a head of the at least one target object. In an embodiment of the present disclosure, a trained classifier is used to determine whether the position of the candidate peak corresponds to a head of the at least one target object. For example, as to the position of the candidate peak obtained by using the depth map, further verification may be performed by using an RGB image. A predetermined region (e.g., a rectangle region) is extracted from an RGB image corresponding to the position of the candidate peak, a pedestrian head classifier that is trained in advance is adopted to determine whether this determined region corresponds to the head of the pedestrian.

If a negative result is obtained in step S405, i.e., the candidate peak does not correspond to the head of the at least one target object, then the processing proceeds to step S401, so as to continuously determine the position of the candidate peak based on the depth video data.

Contrarily, if a positive result is obtained in step S405, i.e., the candidate peak corresponds to the head of the at least one target object, then the processing proceeds to step S406.

In step S406, a head position of the at least one target object is detected. That is, the peak position corresponding to the head of the at least one target object is determined and recorded as the first position of the at least one target object, and this first position is regarded as parameter information of the target object. Thereafter, the processing proceeds to step S407.

In step S407, associating is made between at least two frames of the first video data, to determine the first position of the at least one target object in respective frames of the first video data, and thereby obtain dynamic feature information of the at least one target object. In an embodiment of the present disclosure, it is supposed that the at least one target object is detected in the t-th frame, as to the target object detected in the (t+1)-th frame, similarity relationship of the target object in the t-th frame and the (t+1)-th frame, i.e., a weight of each edge that connects the head of each target object in the t-th frame and the head of each target object in the (t+1)-th frame, may be obtained by using spatial position relationship as well as height, size, color and other information of the head of the target object. According to the Hungarian algorithm or the network flow algorithm, the side having the largest weight is calculated, the head of the target object connected by the edge whose weight is the largest is regarded as the head of the same target object, thereby the position of the target object in successive frames can be determined, accordingly, the dynamic feature information of the target object such as position, speed, and so on can be updated, and an overall movement trajectory of the target object in the monitoring scene can be obtained.

In the above, through steps S401 to S407 in FIG. 4, the at least one target object is detected based on the first video data acquired via the first video acquiring module 21 (the top-view video acquiring module), and the parameter information of the at least one target object in at least one frame of the first video data is determined (step S102), thereby accurately detecting and tracking the target object in the scene being monitored is implemented. Hereinafter, detecting and tracking the target object in the scene being monitored and further obtaining feature information such as identify feature information and action feature information with cooperation of the top-view video acquiring module and the overhead-view video acquiring module will be further described.

Figure 6:
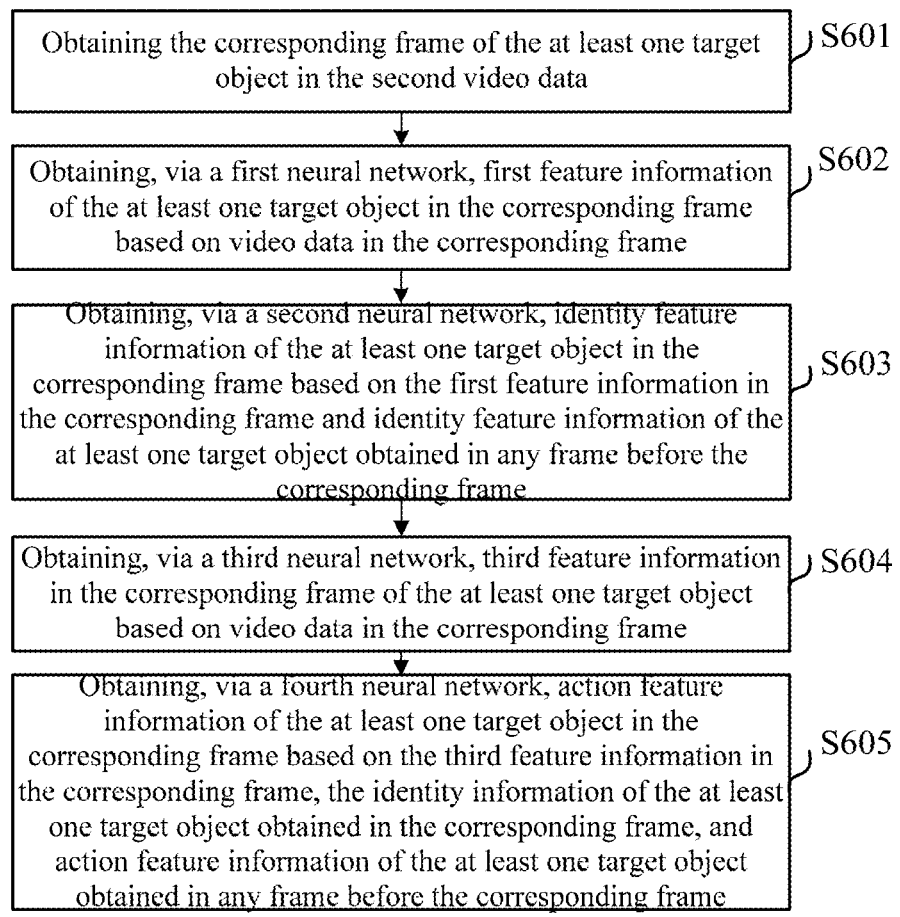
FIG. 6 is a flowchart further illustrating the processing of acquiring identity feature information and action feature information of the target object in the video monitoring method according to an embodiment of the present disclosure.

FIG. 6 is a flowchart further illustrating the processing of acquiring identity feature information and action feature information of the target object in the video monitoring method according to an embodiment of the present disclosure.

As shown in FIG. 6, after determining, based on coordinate transforming relationship between the first video data and the second video data, a second position of the at least one target object in a corresponding frame in the second video data according to the first position in step S103 in FIG. 1, the processing proceeds to step S601 to S605, extracting, based on the second video data, feature information of the at least one target object located in the second position is implemented. In the following text, extracting, by using a neural network, feature information of the at least one target object located in the second position will be described in detail.

In step S601, the corresponding frame of the at least one target object in the second video data is obtained, the at least one target object being located in the second position in the corresponding frame. As described above, the video data in the corresponding frame of the at least one target object in the second position also includes depth video data. Thereafter, the processing proceeds to step S602.

In step S602, first feature information of the at least one target object in the corresponding frame is obtained via a first neural network based on video data in the corresponding frame. The first feature information is used to indicate video data in the corresponding frame. In an embodiment of the present disclosure, the first neural network is a pre-trained convolution neural network (CNN). Thereafter, the processing proceeds to step S603.

In step S603, identity feature information of the at least one target object in the corresponding frame is obtained via a second neural network based on the first feature information in the corresponding frame and identity feature information of the at least one target object obtained in any frame before the corresponding frame.

Figure 7:
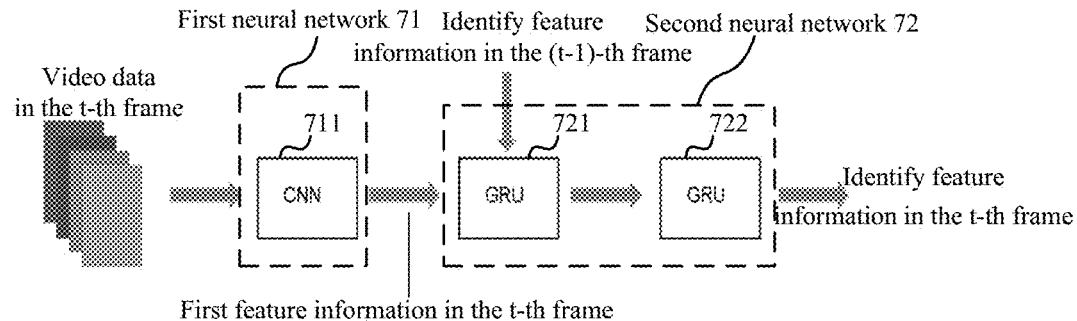
FIG. 7 is a schematic diagram illustrating the processing of acquiring identity feature information of the target object in the video monitoring method according to an embodiment of the present disclosure.

The above steps S602 and S603 will be further described with reference to FIG. 7. FIG. 7 is a schematic diagram illustrating the processing of acquiring identity feature information of the target object in the video monitoring method according to an embodiment of the present disclosure.

As shown in FIG. 7, the video data in the corresponding frame (such as the t-th frame) of the second video data is inputted into the first neural network 71 (in the video data in the t-th frame, the target object is located in the second position), the first neural network 71 may include a convolution neural network CNN 711. First feature information of the t-th frame is obtained via the CNN 711 in the first neural network 71. Further, information of a single frame as extracted by the CNN 711 is inputted into the second neural network 72, besides, an intermediate result already obtained with respect to the previous frame (identify feature information in the (t−1)-th frame) is also inputted into the second neural network 72. The second neural network 72 may include two feedback neural networks GRU (Gated Recurrent Units) (GRU 721 and GRU 722). The GRU 721 is for outputting a classification result of each type of identify feature attribute information based on the identify feature information in the (t−1)-th frame and the first feature information in the t-th frame, and the GRU 722 again combines all the information to output the identify feature attribute information of the target object in the t-th frame, so that each type of identify feature attribute information outputted is more accurate.

In addition, as described above, the identify feature information includes, but not limited to, attribute information such as gender, age, style of dress, height, weight, hair color, hair length etc. Further, as to each identify feature attribute information, it may be quantified as a multi-classification issue. That is to say, there are multiple classification outputs at an output terminal of the second neural network 72, each classification output corresponds to one type of identify feature attribute information.

FIG. 7 shows obtaining the identity feature information in the corresponding frame (the t-th frame) based on the identify feature information in a next frame (the (t−1)-th frame) previous to the corresponding frame (the t-th frame), as will be appreciated, the identity feature information in the corresponding frame (the t-th frame) may also be obtained based on the identify feature information in any frame (the (t−n)-th frame) previous to the corresponding frame (the t-th frame).

Reference is made back to FIG. 6, after identity feature information of the at least one target object in the corresponding frame is obtained in step S603, the processing proceeds to step S604.

In step S604, third feature information in the corresponding frame of the at least one target object is obtained via a third neural network based on video data in the corresponding frame. The third feature information in the corresponding frame is for representing video data in the corresponding frame. In an embodiment of the present disclosure, the third neural network is a convolution neural network (CNN) that is trained in advance. Therefore, the processing proceeds to step S605.

In step S605, action feature information of the at least one target object in the corresponding frame is obtained via a fourth neural network based on the third feature information in the corresponding frame, the identity information of the at least one target object obtained in the corresponding frame, and action feature information of the at least one target object obtained in any frame before the corresponding frame.

Figure 8:
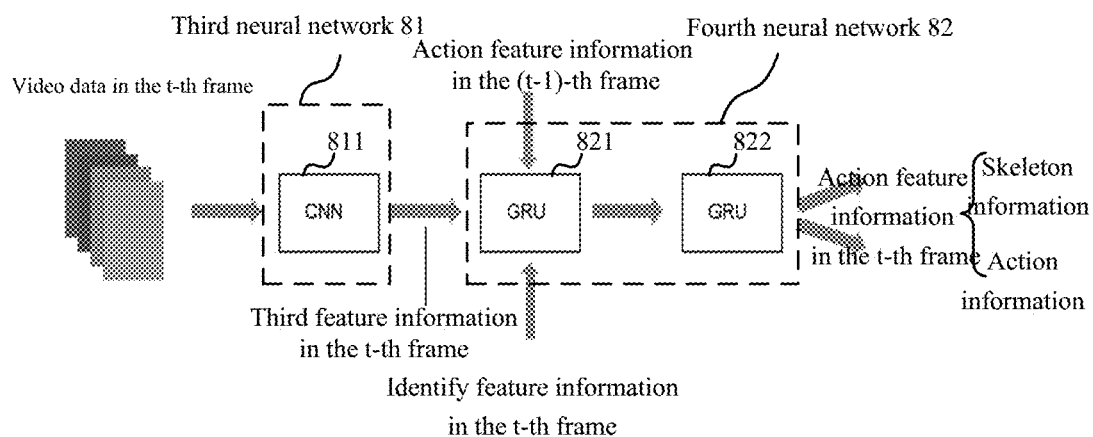
FIG. 8 is a schematic diagram illustrating the processing of acquiring action feature information of the target object in the video monitoring method according to an embodiment of the present disclosure.

The above steps S604 and S605 will be further described with reference to FIGS. 8 and 9. FIG. 8 is a schematic diagram illustrating the processing of acquiring action feature information of the target object in the video monitoring method according to an embodiment of the present disclosure.

As shown in FIG. 8, the video data in the corresponding frame (such as the t-th frame) of the second video data is inputted into the third neural network 81, the third neural network 81 may include a convolution neural network CNN 811. After the third feature information in the t-th frame is obtained via the CNN 811 in the third neural network 81, further, information of a single frame as extracted by the CNN 811 is inputted into the fourth neural network 82, the fourth network 82 may also include two feedback neural networks GRU (Gated Recurrent Units) (GRU 821 and GRU 822). Besides, an intermediate result (action feature information in the (t−1)-th frame) already obtained with respect to the previous frame (the (t−1)-th frame) and the identify feature information in the t-th frame as outputted by the second neural network 72 are also inputted into the fourth neural network 82, because the action feature information of the target object is related to the identify feature information of the target object, for example, height and weight information of the target object may probably cause a different action of the target object to produce a different gesture. The fourth neural network 82 obtains action feature information of the at least one target object in the corresponding frame (i.e., the t-th frame) via a fourth neural network based on the third feature information in the corresponding frame, the identity information of the at least one target object obtained in the corresponding frame, and the action feature information of the at least one target object obtained in any frame before the corresponding frame.

FIG. 8 shows obtaining the action feature information in the corresponding frame (the t-th frame) based on the action feature information in a next frame (the (t−1)-th frame) previous to the corresponding frame, as will be appreciated, it is also possible to obtain the action feature information in the corresponding frame (the t-th frame) based on the action feature information in any frame (the (t−n)-th frame) previous to the corresponding frame.

In an embodiment of the present disclosure, the action feature information may include, but not limited to, skeleton information and action information. Like classification of the identify feature information, the action feature information as also belongs to a multi-classification issue. Besides, as to both the skeleton information and the action information, for example, skeleton decides the target object's gesture, and the gesture further decides a current action of the target object, and vice versa. Thus, similar to classification of the above identify feature information, classification of the action feature information also belongs to a multi-task learning process, monitoring signals from the two parts may be combined, so that the monitoring signals are more complete, and an information amount is more. For example, in the process of training the third neural network 81 and the fourth neural network 82, loss functions obtained based on the skeleton information and the action information may be integrated to adjust parameters of the third neural network 81 and the fourth neural network 82, thereby a combination of the monitoring signals in the two parts can be implemented, and the trained third neural network 81 and the trained fourth neural network 82 are obtained to extract the action feature information of the target object, the action feature information includes skeleton information and action information.

Figure 9:
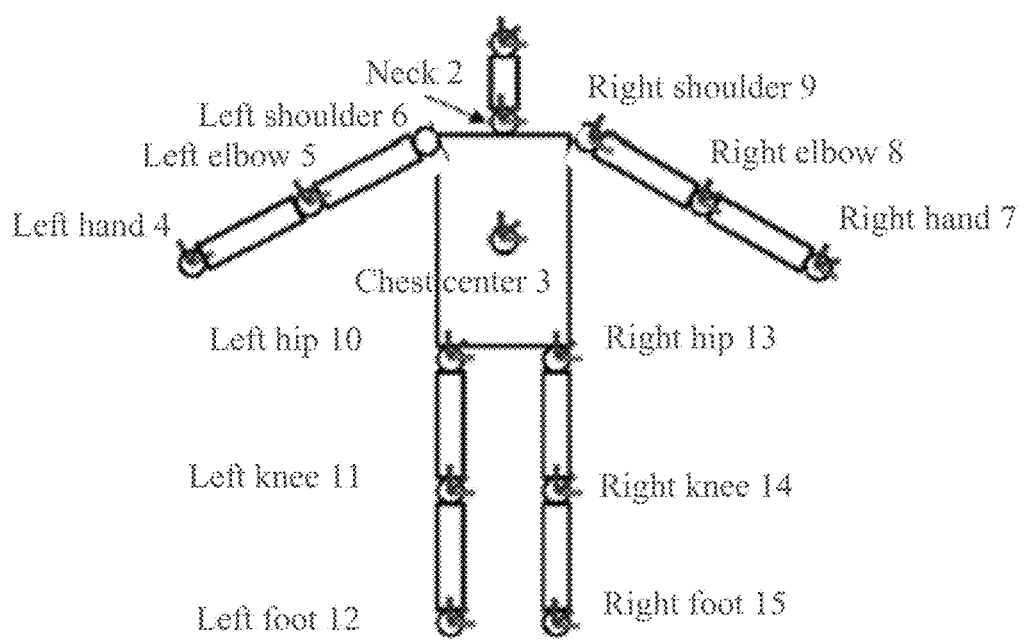
FIG. 9 is a schematic diagram further illustrating the skeleton information acquired in the video monitoring method according to an embodiment of the present disclosure.

FIG. 9 is a schematic diagram further illustrating the skeleton information acquired in the video monitoring method according to an embodiment of the present disclosure. In the schematic diagram shown in FIG. 9, 15 key points on the target object are selected, position coordinate of each key point in the video image is outputted as the skeleton information, the skeleton information may assist in obtaining the action information.

Figure 10:
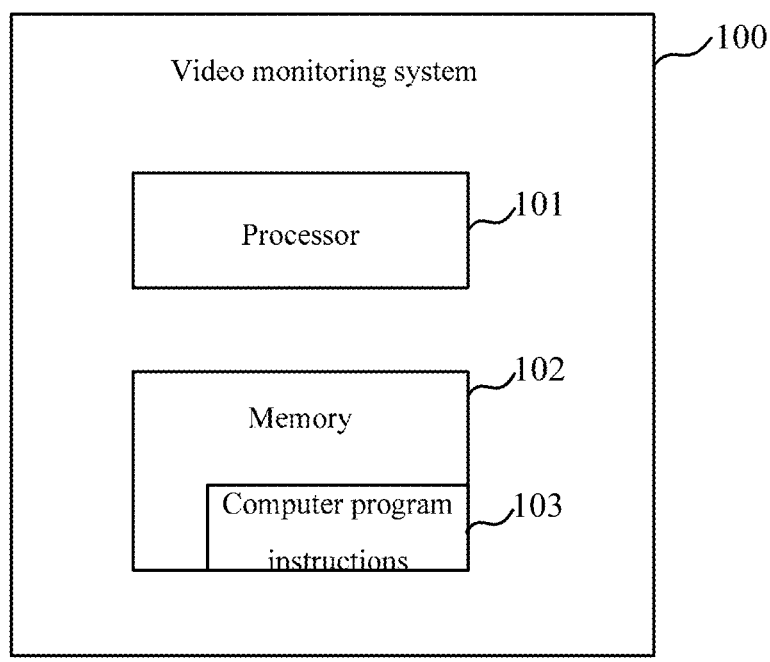
FIG. 10 is a schematic block diagram illustrating the video monitoring system according to an embodiment of the present disclosure.

FIG. 10 is a schematic block diagram illustrating the video monitoring system according to an embodiment of the present disclosure. As shown in FIG. 10, the video monitoring system 100 according to an embodiment of the present disclosure comprises a processor 101, a memory 102, and computer program instructions 103 stored in the memory 102.

The computer program instructions 103 can achieve functions of respective functional modules of the video monitoring system according to an embodiment of the present disclosure and/or execute respective steps of the video monitoring method according to an embodiment of the present disclosure, when being run by the processor 101.

Specifically, the computer program instructions 103 are configured to cause the video monitoring system 100 to execute the following steps when being run by the processor 101: obtaining first video data and second video data of a scene being monitored as acquired simultaneously via a first video acquiring module and a second video acquiring module, respectively; detecting at least one target object based on the first video data, and determining parameter information of the at least one target object in at least one frame of the first video data, the parameter information including a first position; determining, based on coordinate transforming relationship between the first video data and the second video data, a second position of the at least one target object in a corresponding frame in the second video data according to the first position; and extracting, based on the second video data, feature information of the at least one target object located in the second position, wherein orientations with which the first video acquiring module and the second video acquiring module acquire video data with respect to a ground plane are different, and the first video acquiring module and the second video acquiring module include a depth video data acquiring module respectively.

In addition, the computer program instructions 103 are configured to cause the video monitoring system 100 to execute the following steps when being run by the processor 101: disposing the first video acquiring module and the second video acquiring module, and determining a first coordinate parameter of the first video acquiring module and a second coordinate parameter of the second video acquiring module; and determining the coordinate transforming relationship based on the first coordinate parameter and the second coordinate parameter, the first video acquiring module and the second video acquiring module are disposed in different positions, the first video acquiring module is a top-view video acquiring module, and the second video acquiring module is an overhead-view video acquiring module.

In addition, the computer program instructions 103 are configured to cause the video monitoring system 100 to execute the following steps when being run by the processor 101: obtaining a region that includes pixel dots whose depth information is different from ground depth information of the scene being monitored as a foreground candidate region; dividing the foreground candidate region into a plurality of foreground candidate sub-regions according to the depth information; and filtering the plurality of foreground candidate sub-regions based on a first area threshold and/or a first height threshold to obtain a plurality of foreground sub-regions.

In addition, the computer program instructions 103 are configured to cause the video monitoring system 100 to execute the following steps when being run by the processor 101: filtering the plurality of foreground sub-regions to determine a position of a candidate peak that is greater than a second height threshold; and using a trained classifier to determine whether the position of the candidate peak corresponds to a head of the at least one target object.

In addition, the computer program instructions 103 are configured to cause the video monitoring system 100 to execute the following steps when being run by the processor 101: according to a head position detected, associating between at least two frames of the first video data, to determine the first position of the at least one target object in respective frames of the first video data, and thereby obtain dynamic feature information of the at least one target object.

In addition, the computer program instructions 103 are configured to cause the video monitoring system 100 to execute the following steps when being run by the processor 101: obtaining the corresponding frame of the at least one target object in the second video data, the at least one target object being located in the second position in the corresponding frame; obtaining, via a first neural network, first feature information of the at least one target object in the corresponding frame based on video data in the corresponding frame; and obtaining, via a second neural network, identity feature information of the at least one target object in the corresponding frame based on the first feature information in the corresponding frame and identity feature information of the at least one target object obtained in any frame before the corresponding frame.

In addition, the computer program instructions 103 are configured to cause the video monitoring system 100 to execute the following steps when being run by the processor 101: obtaining, via a third neural network, third feature information in the corresponding frame of the at least one target object based on video data in the corresponding frame; and obtaining, via a fourth neural network, action feature information of the at least one target object in the corresponding frame based on the third feature information in the corresponding frame, the identity information of the at least one target object obtained in the corresponding frame, and action feature information of the at least one target object obtained in any frame before the corresponding frame.

Respective modules in the video monitoring system according to an embodiment of the present disclosure may be implemented by that the processor in the video monitoring system according to an embodiment of the present disclosure run the computer program instructions stored in the memory, or may be implemented by that the computer program instructions stored in the computer-readable storage medium of the computer program product according to an embodiment of the present disclosure are run by a computer.

The computer-readable storage medium may be any combination of one or more computer-readable storage mediums, e.g., a computer-readable storage medium containing computer-readable program codes for randomly generating action instruction sequences, another computer-readable storage medium containing computer-readable program codes for carrying out authentication on face activities.

The computer-readable storage medium may for example include a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

According to yet another embodiment of the present disclosure, there is provided a computer program product, comprising a computer-readable medium on which computer program instructions configured to execute the following steps when being run by a computer are stored: obtaining first video data and second video data of a scene being monitored as acquired simultaneously via a first video acquiring module and a second video acquiring module, respectively; detecting at least one target object based on the first video data, and determining parameter information of the at least one target object in at least one frame of the first video data, the parameter information including a first position; determining, based on coordinate transforming relationship between the first video data and the second video data, a second position of the at least one target object in a corresponding frame in the second video data according to the first position; and extracting, based on the second video data, feature information of the at least one target object located in the second position, wherein orientations with which the first video acquiring module and the second video acquiring module acquire video data with respect to a ground plane are different, and the first video acquiring module and the second video acquiring module include a depth video data acquiring module respectively.

Exemplary embodiments of the present disclosure as described in detail in the above are merely illustrative, rather than limitative. However, those skilled in the art should understand that, various modifications, combinations or sub-combinations may be made to these embodiments without departing from the principles and spirits of the present disclosure, and such modifications are intended to fall within the scope of the present disclosure.

What is claimed is:
1. A video monitoring method, comprising:
   obtaining first video data and second video data of a scene being monitored as acquired simultaneously via a first video acquiring module and a second video acquiring module, respectively;
   detecting at least one target object based on the first video data;
   determining parameter information of the at least one target object in at least one frame of the first video data, the parameter information including a first position;
   determining, based on coordinate transforming relationship between the first video data and the second video data, a second position of the at least one target object in a corresponding frame in the second video data according to the first position; and
   extracting, based on the second video data, feature information of the at least one target object located in the second position,
   wherein the first video acquiring module and the second video acquiring module are disposed in different positions, orientations with which the first video acquiring module and the second video acquiring module acquire video data with respect to a ground plane are different, and the first video acquiring module and the second video acquiring module include a depth video data acquiring module respectively.
2. The video monitoring method according to claim 1, further comprising:
   disposing the first video acquiring module and the second video acquiring module, and determining a first coordinate parameter of the first video acquiring module and a second coordinate parameter of the second video acquiring module; and
   determining the coordinate transforming relationship based on the first coordinate parameter and the second coordinate parameter,
   wherein the first video acquiring module is a top-view video acquiring module, and the second video acquiring module is an overhead-view video acquiring module.
3. The video monitoring method according to claim 1,
   wherein the step of detecting at least one target object based on the first video data comprises:
   obtaining a region that includes pixel dots whose depth information is different from ground depth information of the scene being monitored as a foreground candidate region,
   dividing the foreground candidate region into a plurality of foreground candidate sub-regions according to the depth information, and filtering the plurality of foreground candidate sub-regions based on a first area threshold and/or a first height threshold to obtain a plurality of foreground sub-regions.

4. The video monitoring method according to claim 3, wherein the step of detecting at least one target object based on the first video data further comprises:
filtering the plurality of foreground sub-regions to determine a position of a candidate peak that is greater than a second height threshold; and
using a trained classifier to determine whether the position of the candidate peak corresponds to a head of the at least one target object.

5. The video monitoring method according to claim 4, wherein the step of determining parameter information of the at least one target object in at least one frame of the first video data comprises:
according to a head position detected, associating between at least two frames of the first video data, to determine the first position of the at least one target object in respective frames of the first video data, and thereby obtain dynamic feature information of the at least one target object.

6. The video monitoring method according to claim 1, wherein the step of extracting, based on the second video data, feature information of the at least one target object located in the second position comprises:
obtaining the corresponding frame of the at least one target object in the second video data, the at least one target object being located in the second position in the corresponding frame;
obtaining, via a first neural network, first feature information of the at least one target object in the corresponding frame based on video data in the corresponding frame; and
obtaining, via a second neural network, identity feature information of the at least one target object in the corresponding frame based on the first feature information in the corresponding frame and identity feature information of the at least one target object obtained in any frame before the corresponding frame.

7. The video monitoring method according to claim 6, wherein the step of extracting, based on the second video data, feature information of the at least one target object located in the second position further comprises:
obtaining, via a third neural network, third feature information in the corresponding frame of the at least one target object based on video data in the corresponding frame; and
obtaining, via a fourth neural network, action feature information of the at least one target object in the corresponding frame based on the third feature information in the corresponding frame, the identity information of the at least one target object obtained in the corresponding frame, and action feature information of the at least one target object obtained in any frame before the corresponding frame.

8. The video monitoring method according to claim 7, wherein the action feature information includes skeleton information and action attribute information, the skeleton information includes a plurality of key points on skeleton of the at least one target object, the fourth neural network outputs coordinate positions of the plurality of keys in the corresponding frame.

9. A video monitoring system comprising:
a first video acquiring module for acquiring first video data of a scene being monitored;
a second video acquiring module for acquiring second video data of the scene being monitored simultaneously with the first video acquiring module, the first video acquiring module and the second video acquiring module being disposed in different positions, orientations with which the first video acquiring module and the second video acquiring module acquire video data with respect to a ground plane being different, and the first video acquiring module and the second video acquiring module including a depth video data acquiring module respectively; and
a video monitoring module for monitoring at least one target object in a video based on video data, the video monitoring module including:
a monitored target object determining unit for:
detecting at least one target object based on the first video data, and
determining parameter information of the at least one target object in at least one frame of the first video data, the parameter information including a first position;
a video coordinate transforming unit for determining, based on coordinate transforming relationship between the first video data and the second video data, a second position of the at least one target object in a corresponding frame in the second video data according to the first position; and
a feature information extracting unit for extracting, based on the second video data, feature information of the at least one target object located in the second position.

10. The video monitoring system according to claim 9, wherein the first video acquiring module is a top-view video acquiring module, and the second video acquiring module is an overhead-view video acquiring module,
the video coordinate transforming unit determines a first coordinate parameter of the first video acquiring module and a second coordinate parameter of the second video acquiring module, and determines the coordinate transforming relationship based on the first coordinate parameter and the second coordinate parameter.

11. The video monitoring system according to claim 9, wherein the monitored target object determining unit obtains a region that includes pixel dots whose depth information is different from ground depth information of the scene being monitored as a foreground candidate region, divides the foreground candidate region into a plurality of foreground candidate sub-regions according to the depth information, and filters the plurality of foreground candidate sub-regions based on a first area threshold and/or a first height threshold to obtain a plurality of foreground sub-regions.

12. The video monitoring system according to claim 11, wherein the monitored target object determining unit filters the plurality of foreground sub-regions to determine a position of a candidate peak that is greater than a second height threshold, and uses a trained classifier to determine whether the position of the candidate peak corresponds to a head of the at least one target object.

13. The video monitoring system according to claim 12, wherein the monitored target object determining unit associates, according to a head position detected, between at least two frames of the first video data, to determine the first position of the at least one target object in respective frames of the first video data, and thereby obtain dynamic feature information of the at least one target object.

14. The video monitoring system according to claim 9, wherein the feature information extracting unit:
obtains the corresponding frame of the at least one target object in the second video data, the at least one target object being located in the second position in the corresponding frame;
obtains, via a first neural network, first feature information of the at least one target object in the corresponding frame based on video data in the corresponding frame, and
obtains, via a second neural network, identity feature information of the at least one target object in the corresponding frame based on the first feature information in the corresponding frame and identity feature information of the at least one target object obtained in any frame before the corresponding frame.

15. The video monitoring system according to claim 14, wherein the feature information extracting unit:
obtains, via a third neural network, third feature information in the corresponding frame of the at least one target object based on video data in the corresponding frame, and
obtains, via a fourth neural network, action feature information of the at least one target object in the corresponding frame based on the third feature information in the corresponding frame, the identity information of the at least one target object obtained in the corresponding frame, and action feature information of the at least one target object obtained in any frame before the corresponding frame.

16. A video monitoring device, comprising:
a processor;
a memory; and
computer program instructions stored in the memory and configured to execute the following steps when being run by the processor:
obtaining first video data and second video data of a scene being monitored as acquired simultaneously via a first video acquiring module and a second video acquiring module, respectively;
detecting at least one target object based on the first video data;
determining parameter information of the at least one target object in at least one frame of the first video data, the parameter information including a first position;
determining, based on coordinate transforming relationship between the first video data and the second video data, a second position of the at least one target object in a corresponding frame in the second video data according to the first position; and
extracting, based on the second video data, feature information of the at least one target object located in the second position,
wherein the first video acquiring module and the second video acquiring module are disposed in different positions, orientations with which the first video acquiring module and the second video acquiring module acquire video data with respect to a ground plane are different, and the first video acquiring module and the second video acquiring module include a depth video data acquiring module respectively.

17. The video monitoring device according to claim 16, wherein the step of detecting at least one target object based on the first video data, which is executed when the computer program instructions are run by the processor, comprises:

obtaining a region that includes pixel dots whose depth information is different from ground depth information of the scene being monitored as a foreground candidate region;
dividing the foreground candidate region into a plurality of foreground candidate sub-regions according to the depth information;
filtering the plurality of foreground candidate sub-regions based on a first area threshold and/or a first height threshold to obtain a plurality of foreground sub-regions;
filtering the plurality of foreground sub-regions to determine a position of a candidate peak that is greater than a second height threshold; and
using a trained classifier to determine whether the position of the candidate peak corresponds to a head of the at least one target object.

18. The video monitoring device according to claim 17, wherein step of determining parameter information of the at least one target object in at least one frame of the first video data, which is executed when the computer program instructions are run by the processor, comprises:
according to a head position detected, associating between at least two frames of the first video data, to determine the first position of the at least one target object in respective frames of the first video data, and thereby obtain dynamic feature information of the at least one target object.

19. The video monitoring device according to claim 16, wherein the step of extracting, based on the second video data, feature information of the at least one target object located in the second position, which is executed when the computer program instructions are run by the processor, comprises:
obtaining the corresponding frame of the at least one target object in the second video data, the at least one target object being located in the second position in the corresponding frame;
obtaining, via a first neural network, first feature information of the at least one target object in the corresponding frame based on video data in the corresponding frame; and
obtaining, via a second neural network, identity feature information of the at least one target object in the corresponding frame based on the first feature information in the corresponding frame and identity feature information of the at least one target object obtained in any frame before the corresponding frame.

20. The video monitoring device according to claim 19, wherein the step of extracting, based on the second video data, feature information of the at least one target object located in the second position, which is executed when the computer program instructions are run by the processor, further comprises:
obtaining, via a third neural network, third feature information in the corresponding frame of the at least one target object based on video data in the corresponding frame; and
obtaining, via a fourth neural network, action feature information of the at least one target object in the corresponding frame based on the third feature information in the corresponding frame, the identity information of the at least one target object obtained in the corresponding frame, and action feature information of the at least one target object obtained in any frame before the corresponding frame.

\* \* \* \* \*